United States Patent [19]

Boehm

[11] Patent Number: 5,073,748
[45] Date of Patent: Dec. 17, 1991

[54] METHOD FOR LIMITING THE RATE-OF-CHANGE OF ACCELERATION IN NUMERICAL DRIVING SYSTEMS

[75] Inventor: Manfred Boehm, Pretzfeld, Fed. Rep. of Germany

[73] Assignee: Siemens Aktiengesellschaft, Berlin & Munich, Fed. Rep. of Germany

[21] Appl. No.: 589,077

[22] Filed: Sep. 27, 1990

[30] Foreign Application Priority Data

Sep. 27, 1989 [EP] European Pat. Off. ........ 89117900.4

[51] Int. Cl.⁵ ............................................. G05B 19/18
[52] U.S. Cl. ..................................... 318/569; 318/561; 318/603; 187/116; 187/118
[58] Field of Search ........................ 318/569, 561, 603; 187/116, 118

[56] References Cited

U.S. PATENT DOCUMENTS 3,828,236  8/1974  Close .................................... 318/561
3,859,581  1/1975  Gardner ........................... 318/603 X
4,603,286  7/1986  Sakano ............................... 318/615
4,769,583  9/1988  Goor ................................. 318/569 X

OTHER PUBLICATIONS

Patent Abstracts of Japan, vol. 12, No. 408 p. 778, 28 Oct. 1988 & JP-A-63-146105 (Mitsubishi Electronic Corp.) 18 Jun. 1988.

Primary Examiner—William M. Shoop, Jr.
Assistant Examiner—Saul M. Bergmann
Attorney, Agent, or Firm—Kenyon & Kenyon

[57] ABSTRACT

A numerically-controlled driving system has a rate-of-change limiter that is applicable to positioning- and continuous-path-control systems as used in robots, machine tools, elevators, etc. When control signals are input, sudden variations in acceleration or velocity are damped, because the discrete control values calculated by a numerical control system are filtered by a pulse filter in accordance with the principle of discrete convolution.

1 Claim, 3 Drawing Sheets

METHOD FOR LIMITING THE RATE-OF-CHANGE OF ACCELERATION IN NUMERICAL DRIVING SYSTEMS

BACKGROUND OF THE INVENTION

The present invention relates generally to numerically controlled driving systems, and more particularly to such systems having an acceleration rate-of-change limiter.

In many technical applications of driving systems, as used for example in conveying machinery, elevators, machine tools, industrial robots, rolling-mill installations or vehicle control systems, it is necessary to generate a sequence of movements in accordance with defined paths. In numerically controlled driving systems, a sequence of position settings is preselected in one or more coordinates for a specific time period. The control system must calculate a precise acceleration and velocity profile for the transition between two position settings and transmit this profile to the driving system. The goal is to use the permissible traversing velocities and the available driving power as efficiently as possible without distorting the contour through limiting effects or overshooting.

The object of the present invention is to develop numerical positioning- or continuous-path-control systems that avoid sudden variations in the acceleration settings.

SUMMARY OF THE INVENTION

The present invention achieves this objective by a method that limits the acceleration rate-of-change in numerically controlled, motorized driving systems. This method applies the previously determined acceleration-controlled, discrete con,trol values tp the input of a pulse times filter at discrete command times. The pulse time, filter has unity steady state gain and a pulse width in the time domain that is a multiple of the time difference between the command times. The filtered discrete control values are then applied to the driving system.

DETAILED DESCRIPTION

Figure 1:
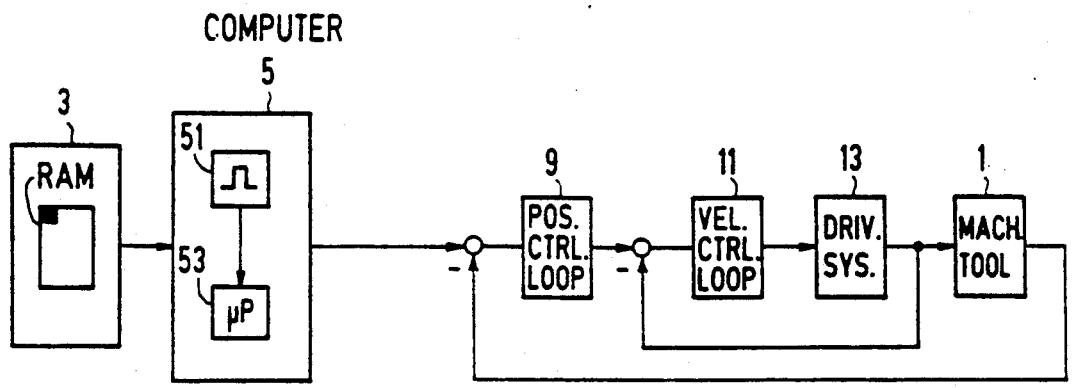
FIG. 1 the structure of a computer driven control of a numerically controlled machine tool.

FIG. 1 shows the structure of a computer controlling a numerically controlled machine tool 1. The information stored, for example, in a read-write RAM memory is entered from an input device 3 into a computer 5. The computer 5 decodes the input information, makes interpolations, performs calculations to determine the position settings for the position control loop L, performs velocity calculations and takes over the sequencing control. The computer 5 contains a clock generator 51 to produce a clock signal. A defined number of clock pulses of the clock generator 51 forms a computing period or command time T. At a command time T, new position settings must be calculated for each position control loop. The computer 5 outputs position settings to the position control loop 9. Each position control loop 9 compares the position setting to the actual position of the machine tool 1 and controls a velocity control loop 11 for the driving system(s) 13 of the respective machine axis. For every command time, a computing device 53 of the computer 5 supplies an acceleration- and velocity-proportional path increment, which is transmitted to the individual controlled machine axes by means of an appropriate interpolation.

Before going into detail about the acceleration rate-of-change limitation for discrete control signals, a method will first be described based on FIGS. 2 to 4, whereby a sequence of acceleration-con,trolled, discrete control values are generated and an acceleration rate-of-change limitation can be advantageously applied.

Figure 2:
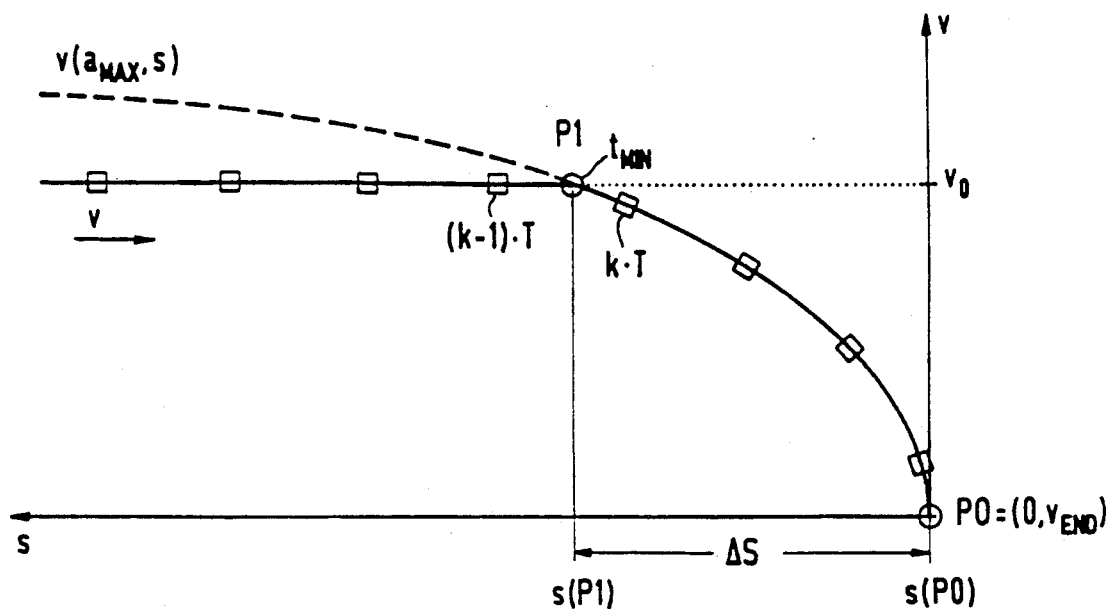
FIG. 2 diagram of the velocity profile across the path with maximum acceleration.

FIG. 2 illustrates a velocity-path diagram for the braking operation of a driving system. The driving system could propel, for example, the leading spindle and therefore also a sliding carriage of the machine tool 1. As the velocity arrow with the velocity v shows, the sliding carriage moves in the direction of diminishing values of the position S. First, the sliding carriage is moved with the constant velocity $v_o$ At the point PO, i.e. the origin of the coordinate system, the sliding carriage should have zero acceleration and final velocity $v_{END}$. The constant traversing velocity $v_0$ must be reduced, so that the target point s(PO) is reached with final velocity $v_{END}$. For the maximum deceleration $a_{MAX}$ achievable by the driving system, the velocity profile terminating at $v_{END}$ is the parabola shown in FIG. 2. This parabola intersects the straight line with the constant velocity $v_0$ at the point P1 identified by a circle. To reach the target point PO with the final velocity $v_{END}$, one would have to decelerate exactly at this point P1 with the acceleration $a_{MAX}$. ("Acceleration" is used in its general sense, therefore to include "braking" or "decelerating" as well).

The command times, which correspond to the computation period of the numerical control of the computer 5, are shown in the diagram of FIG. 2. As is apparent, the intersection point of the parabola with the acceleration $a_{MAX}$ and of the straight line with the constant velocity $v_0$ lies between the command times $(k-1) \cdot T$ and $k \cdot T$. However, the numerical control can specify velocity and acceleration settings at command times only. Therefore, if there had already been a deceleration at the command time $(k-1) \cdot T$ with the acceleration $a_{MAX}$, then the traversing motion of the sliding carriage will reach the final velocity $V_{END}$ before the point PO. If the acceleration $a_{MAX}$ starts at the command time $k \cdot T$, then the sliding carriage will drive past the point PO.

Now, it would be conceivable to decelerate already at the command time $(k-1) \cdot T$ with an acceleration a, which is less than the maximum acceleration $a_{MAX}$, and to select this acceleration, so that the point PO would be accurately reached. However, this measure would leave up to chance whether the target point PO would be reached at a command time T, so that for the subsequent positioning, and traversing operation, one is again confronted with the same problems that occurred when the first deceleration was introduced.

The method described in greater detail in the following guarantees that an acceleration or deceleration of a driving system introduced at one command time reaches a specified target point with a defined final velocity exactly at one command time. For this purpose, at least two acceleration values are calculated by the computer 5 of a numerical control system, in accordance with simple kinematic relations and with a minimal computation, and are transmitted to the numerical control system. The necessary equations are derived in the following based on FIG. 3.

Figure 3:
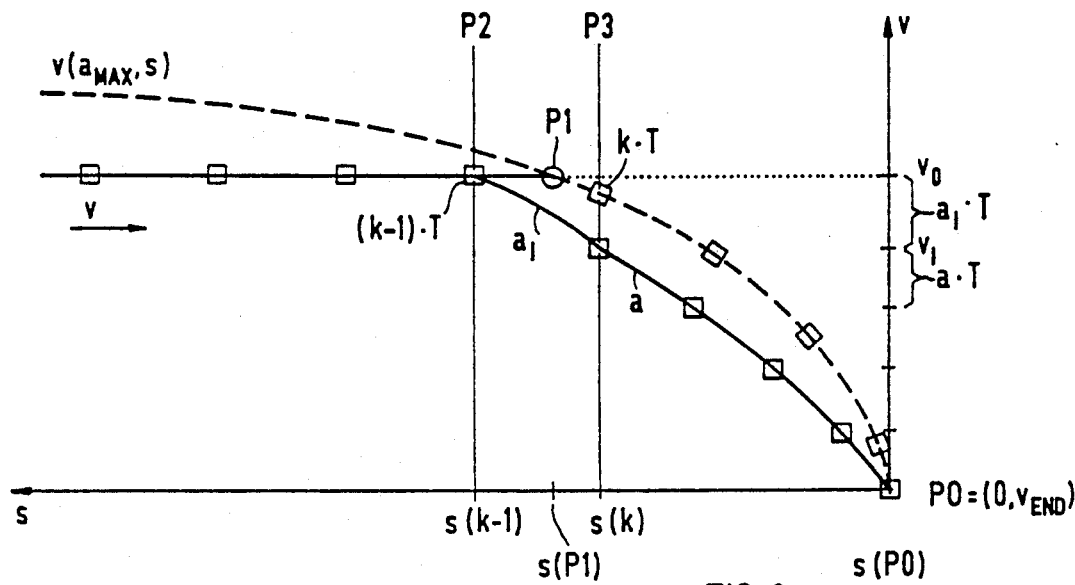
FIG. 3 is a diagram of the velocity profile across the path with the acceleration profiles adapted to the clock pulses.

FIG. 3 depicts a velocity-path diagram with the acceleration $a_{MAX}$ in the form of a parabola described in connection with FIG. 2, but drawn as a dotted line. Another part of a parabola with the acceleration $a_1$ is drawn in between the points P2 and P3, and a part of another parabola with the acceleration a between the points P3 and P0.

A transition to the braking parabola with the acceleration a is only attainable at a command time T. The following applies:

$$|a_1| < |a_{MAX}| \qquad \text{Equation 1}$$

The approach velocity $v_1$ at point P3 is the velocity that one is supposed to brake with the acceleration a and can be determined by:

$$v_1 = v_0 + a_1 \cdot T \qquad \text{Equation 2}$$

The accelerations $a_1$ and a are to be selected so that the target point P0 is reached after an integral number of intervals between command times. The time at which the braking operation is introduced with the acceleration $a_1$ is $t = (k-1) \cdot T$.

For the path length between the point P2 and P3, one obtains $$s(k-1) - s(k) = v_0 \cdot T + \tfrac{1}{2} a_1 \cdot T^2 \qquad \text{Equation 3}$$

The residual path $s(k)$ to be covered with the acceleration a is can be determined from this equation as a function of the approach acceleration $a_1$. This residual path $s(k)$ is exactly that path, in which the approach velocity $v_1$ according to equation 2 must be decelerated to the final velocity $v_{END}$ in the time t, which corresponds to an integral multiple J of the time between command times time T. Therefore, it applies that:

$$t = J \cdot T \qquad \text{Equation 4}$$

where J is an integer.

For the residual path $s(k)$ to be covered with the acceleration a, the so-called time-free equation applies for uniformly accelerated motions with the initial velocity:

$$s(k) = (v_1^2 - v_{END}^2)/(2a) \qquad \text{Equation 5}$$

Using equations 2 and 5, the residual path $s(k)$ becomes:

$$s(k) = ((v_0 + a_1 \cdot T)^2 - v_{END}^2)/(2a) \qquad \text{Equation 6}$$

$$s(k) = ((v_0 + a_1 \cdot T) + v_{END}) \cdot ((v_0 + a_1 \cdot T) - v_{END})/(2a) \qquad \text{Equation 7}$$

The following equation applies for the approach velocity $v_1$:

$$v_1 = J \cdot T \cdot a \qquad \text{Equation 8}$$

By comparing the duration of the continuous braking operation with the acceleration $a_{MAX}$, J can be properly selected according to the following:

$$J = \text{an integral term } ((v_1 - v_{END})/(a_{MAX} \cdot T)) + C \qquad \text{Equation 9}$$

where C=0,1,2, so that the braking operation including the approach interval between the points P2 and P3 would last for a maximum of three intervals longer than a continuous braking operation with a maximum deceleration.

The acceleration a becomes:

$$a = (V_1 - V_{END})/(J \cdot T) \qquad \text{Equation 10}$$

substituting equation 2

$$a = (V_0 + a_1 \cdot T - v_{END})/(J \cdot T) \qquad \text{Equation 11}$$

Using equations 7 and 11, one obtains $$s(k) = \tfrac{1}{2} J \cdot T \cdot (v_0 + a_1 \cdot T + v_{END}) \qquad \text{Equation 12}$$

If one equates equation 3 and equation 12, then one obtains for the approach acceleration:

$$a_1 = \frac{2s(k-1) - (J+2) \cdot T \cdot v_0 - J \cdot T \cdot v_{END}}{(J+1) \cdot T^2} \qquad \text{Equation 13}$$

If, then, the value of J is determined according to equation 9, the approach acceleration $a_1$ can be calculated with minimal computation according to equation 13 (Note: equation 13 only shows a quadratic term as the most comprehensive computing operation).

Figure 4:
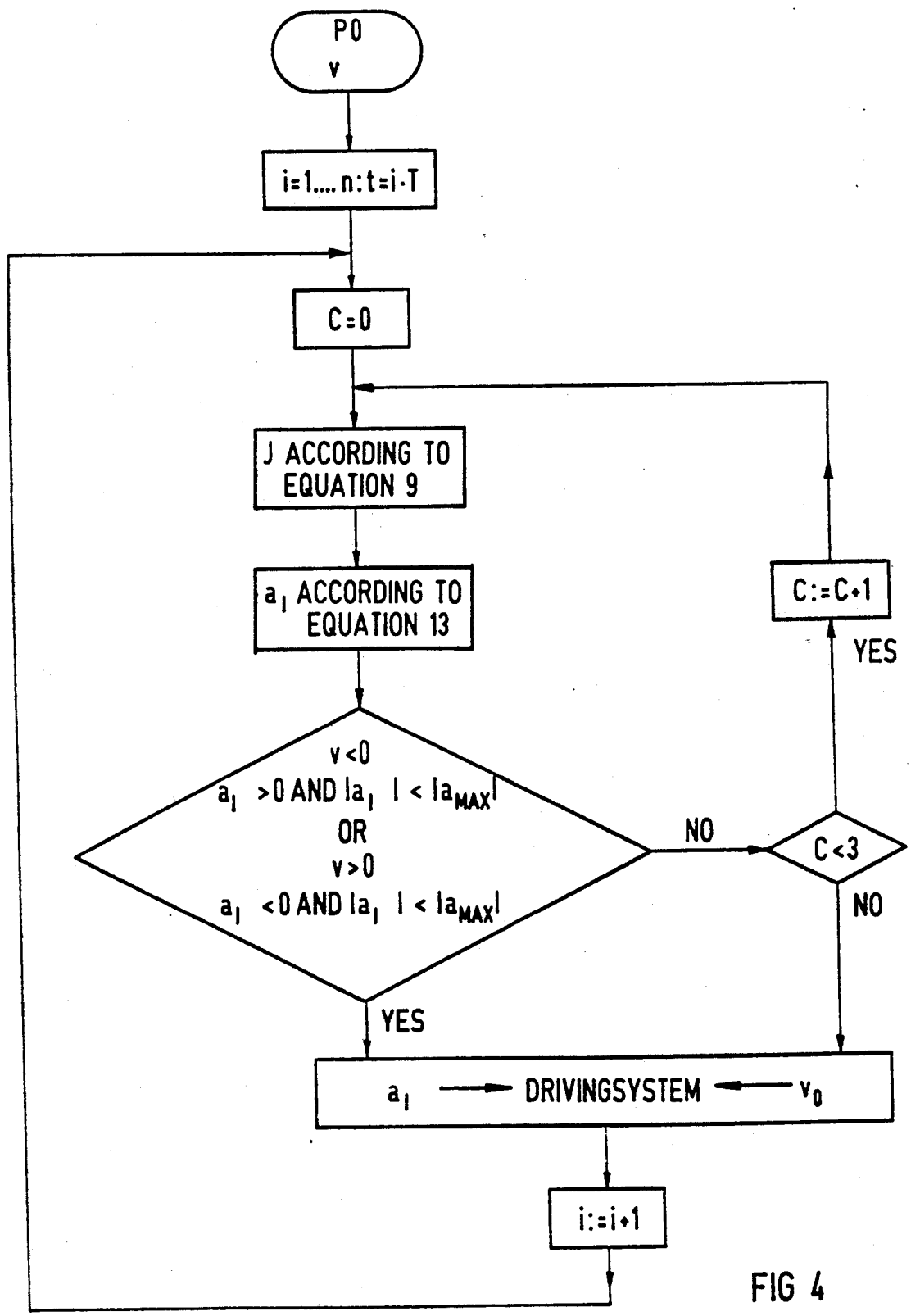
FIG 4 is a flow chart.

The flow chart of FIG. 4 clarifies the steps to be implemented by the numerical control with reference to the above equations.

In a first step, the target point P0 and the final velocity $v_{END}$, at which the target point P0 is supposed to be reached, are transferred to the numerical control. The following process steps are implemented at every command time i·T, where the counting variable i runs from 1 to n. First, the constant C=0 is set; then J is defined according to equation 9 with this constant. After J is defined, the approach acceleration $a_1$ can be calculated according to equation 13. In the case of positive travel, that is when v is less than 0, one tests if the approach acceleration $a_1$ is greater than 0 and if the magnitude of the approach acceleration $|a_1|$ is less than the magnitude of the maximum acceleration $|a_{MAX}|$. If there is negative travel, that is when the velocity v is greater than 0, one tests if the approach acceleration $a_1$ is less than 0 and if the magnitude of the approach acceleration $|a_1|$ is less than the magnitude of the maximum acceleration $|a_{MAX}|$. If one of these conditions if fulfilled, then the approach acceleration $a_1$ is applied to the driving system. If neither of the two conditions is fulfilled, then, as long as C is smaller than 3, the constant C is incremented by the value "one" and the steps are repeated. If the conditions are not fulfilled for the value C=2, then the constant velocity $v_0$ will continue to be applied to the driving system. These steps are then repeated until the target point PO is reached with the approach velocity $v_{END}$.

At this point, it should again be mentioned explicitly that it is not necessary to calculate the acceleration a from the approach acceleration $a_1$, whereby this acceleration a is the acceleration with which the target point PO is finally reached with the final velocity $v_{END}$. When, as described, the approach acceleration $a_1$ is calculated at every command time T according to the indicated equation 13, then it is automatically guaranteed that the target point PO is reached at a command time T.

According to the invention, an acceleration rate-of-change limitation is provided to ensure that the driving system does not experience any sudden changes as a result of the acceleration changes $a_1$. Such an acceleration rate-of-change limitation can be achieved for example by filtering the acceleration values to round off the edges of a particular acceleration pulse so that the respective new acceleration value is reached gradually. Of course, this applies in the same way to changes in velocity.

Figure 5:
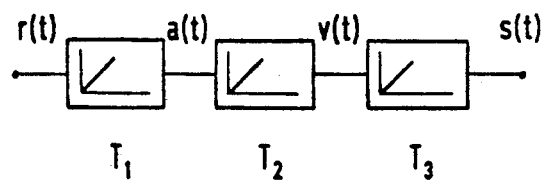
FIG. 5 is a block diagram which illustrates how acceleration rate-of-change, acceleration, velocity and position are related.

Based on an automatic-control engineering block diagram with the integrators $T_1$, $T_2$, Thd 3, FIG. 5 shows how acceleration rate-of-change r(t), acceleration a(t), velocity v(t) and position s(t) are related. This relationship is defined mathematically as:

$$r = \frac{da(t)}{dt} = \frac{d^2v(t)}{dt^2} = \frac{d^3s}{dt^3} \qquad \text{Equation 14}$$

an acceleration rate-of-change limitation by means of a pulse time filter based on a discrete convolution is explained in greater detail in the following.

Employing equations 9 and 13, a sequence of velocity settings v(k) are generated for an arbitrary path from the position $s_1(m)$ (at the moment m·T) to $s_2$. The position $s_1$ is able to be expressed, in accordance With equation 15, as a linear combination of the individual velocity settings:

$$\begin{aligned} s_1(m) &= s_0 + \sum_{k=0}^{m} v_{(k-1)} \cdot T + \tfrac{1}{2}[v_{(k)} - v_{(k-1)}] \cdot T \\ &= s_0 + \sum_{k=0}^{m} \tfrac{1}{2}[v_{(k)} + v_{(k-1)}] \cdot T \end{aligned} \qquad \text{Equation 15}$$

The position s is likewise reached on the basis of the linearity, when instead of the sequence v(k), the sequence $v_r(k)$ is specified. One obtains the sequence $v_r(k)$ from v(k) by convolving v(k) with a pulse time filter having a width in the time domain of $T_M = M \cdot T$. When the filter has a unity steady state gain, and the impulse response in the time domain becomes $$g(k) = \begin{cases} \dfrac{1}{T_M} & \text{for } k \text{ smaller than } M; \\ 0 & \text{otherwise} \end{cases} \qquad \text{Equation 16}$$

Figure 6:
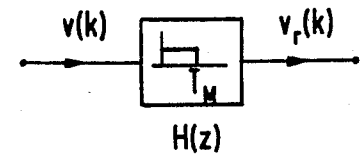
FIG. 6 is a block diagram of a pulse time filter.

This convolution is graphically depicted in FIG. 6. A sequence of velocity settings $v_{(k)}$ are transmitted to the pulse time transfer function H(z). As a result of the filtering, one obtains a sequence of velocity settings $v_r(k)$.

Figure 7:
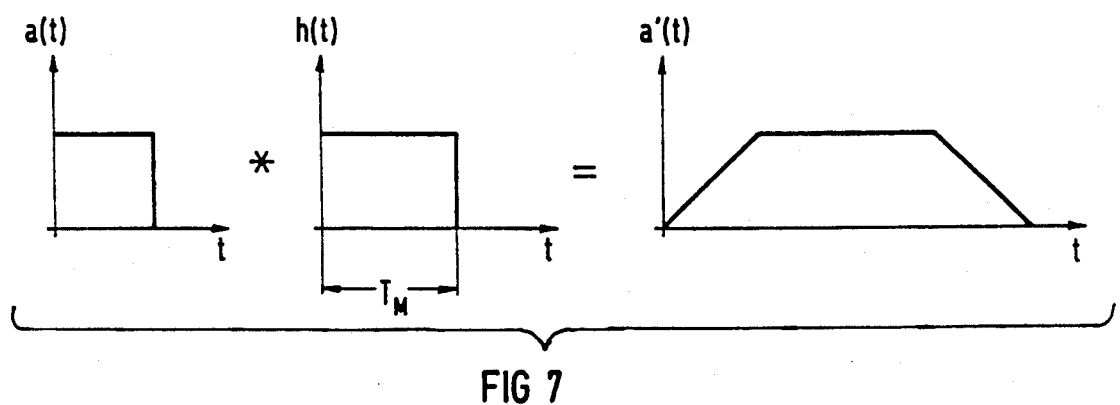
FIG. 7 is a diagram of the formation of a rate-of-change of acceleration limited operation.

After convolving the acceleration a(t) with the pulse time filter h(t) as shown in FIG. 7, a maximum acceleration rate-of-change results in other words the derivative of the acceleration $$r_{MAX} \leq 1/T_M \cdot a_{MAX} \qquad \text{Equation 17}$$

For medium and small paths, exact positioning without overshoot is still guaranteed. The acceleration rate-ofchange can then increase to the value $$r_{MAX} \leq 2/T_M \cdot a_{MAX}. \qquad \text{Equation 18}$$

If necessary, the mean value for small paths must therefore be generated with double the window width $(2T_M)$.

The described acceleration rate-of-change limitation by means of the pulse time filter corresponds to a discrete convolution which is illustrated, for reasons of simpiicity, for the continuous case in FIG. 7. The acceleration a(t) within one command interval is convolved with the transfer function h(t) by the pulse time filter. The result of the convolution a'(t) shows that the resulting acceleration no longer increases abruptly, but rather in a continuous fashion. The convolution relation for the continuous case is:

$$a'(t) = a(t) * h(t) = \int_0^\infty a(t) \cdot h(\tau - t) d\tau \qquad \text{Equation 19}$$

What is claimed is:
1. A method for limiting a rate-of-change of acceleration for a numerically controlled, driving system comprising the steps of:
   (a) determining acceleration-controlled, discrete control values for the driving system;
   (b) inputting said discrete control values to a pulse time filter at discrete command times, said pulse time filter having a unity steady state gain and a pulse width in a time domain that is a multiple of a difference between the command times;
   (c) filtering said discrete control values with the pulse time filter; and
   (d) applying the filtered discrete control values to the driving system.

* * * * *